United States Patent Office 3,332,914
Patented July 25, 1967

3,332,914
CARBOXYLIC TERMINATED HYDROCARBON SULFUR POLYMERS
Albert J. Costanza, Akron, Ohio, assignor to The Goodyear Tire & Rubber Company, Akron, Ohio, a corporation of Ohio
No Drawing. Filed Dec. 9, 1963, Ser. No. 329,292
9 Claims. (Cl. 260—79)

This invention relates to hydrocarbon sulfur copolymers which contain reactive terminal groups consisting of esters and carboxylic acids and to the method of making and using such materials to obtain reactive mixtures useful as liquid casting or potting compositions.

An object of this invention is to provide a method for preparing carboxyl terminated polymers containing some sulfur interspersed within the backbone of the largely hydrocarbon polymer and thus provide a method for converting the readily available materials of sulfur and conjugated dienes and mono alpha olefins into carboxyl terminated polymers which can be used in a liquid casting or potting operation.

The objects of this invention are accomplished by cleaving a polymer of the formula:

$$M_a(S_xM_b)_yS_t$$

where the subscripts have the values given hereinafter with a cleaving agent such as lithium aluminum hydride and the combination agent, zinc and a nonoxidizing mineral acid to obtain a lower molecular weight mercaptan polymer of the formula:

$$HSM_p(S_xM_q)_kSH$$

where the subscripts have the values given hereinafter, and then reacting the mercaptan polymer with the lower alkyl ester of an unsaturated carboxylic acid in the presence of a base. The preferred esters are derived from acrylic acid and methacrylic acid with the methyl ester of acrylic acid being the preferred member of the lower alkyl esters where the alkyl radical has from 1 to 10 carbon atoms. The reaction of the lower alkyl esters of the unsaturated carboxylic acid with the mercaptan polymer is achieved at about 20 to 50° C. Temperatures up to about 100° C. can be used. Also, temperatures as low as about the freezing point of the solvent may be used, although the resulting increase in viscosity of the reactants and product increase the operative difficulties.

The reaction of the thiol groups of the thiol terminated polymer with the ethylenic group of the lower alkyl ester of the unsaturated carboxylic acid to yield the ester terminated polymer is best achieved in the presence of about 0.1 mol of a base such as the alkali and alkaline earth hydroxides and the amines, per mol of the thiol terminated polymer.

The ester terminated polymer is hydrolyzed in the presence of about 1.5 to 2 mols of a base such as sodium or potassium hydroxide per mol of lower alkyl ester used. Usually about 1 mol to 10 mols of water per mol of base is used. Better hydrolysis results are obtained in the presence of 1–3 mols of water and 1 mol of ethanol or water miscible solvent, together with a like amount of an aromatic solvent such as benzene or xylene.

Hydrolysis of the ester terminated polymer forms the acid salt which upon treatment with sufficient acid yields the carboxylic acid terminated polymer.

The cleaving of the copolymers of sulfur and at least one diene is achieved by treating this copolymer with a solvent to cause the copolymer to swell and then treating the swollen polymer with a hydrogenolysis agent such as the alkali aluminum hydrides or a combination of metallic zinc and hydrochloric acid. The hydrogenolitic agent cleaves the sulfur-to-sulfur bonds in the groups of sulfur atoms in the polymer backbone to yield a polymeric product of lower molecular weight, usually about 500 to 10,000 and preferably 1,000 to 5,000. This lower molecular weight polymer also contains at least two mercapto groups per molecule, some monosulfide sulfur in the carbon-to-carbon chain of the cleaved polymer molecule and at least one double bond. The cleaved liquid polymers of this invention have viscosities at 25° C. of from about 20,000 to 100,000 centipoises or higher. The cleaved liquid polymer will contain at least one carbon-to-carbon double bond for each 1,000 units of molecular weight.

The solvents useful in the cleaving step of this invention are those capable of swelling the sulfur copolymer, but are inert to the hydrogenolysis agents being used. When the zinc-hydrochloric acid combination is used it is necessary that some water be present so mixtures of solvents such as benzene and ethanol, toluene and isopropanol, toluene and ethanol, benzene and acetic acid, or xylene and ethanol are desired. When lithium aluminum hydride is used it is necessary to operate under anhydrous conditions and in the absence of compounds possessing active hydrogens such as alcohols and acids. Aromatic solvents such as benzene and toluene, etc., as well as aliphatic solvents such as hexane, heptane, cyclohexane, etc. may be used for swelling the polymer. Ethers such as tetrahydrofuran, diethylether may be used to dissolve the lithium aluminum hydride so it may be added to the swollen polymer conveniently as a solution. The preferred solvents are heptane for swelling the polymer and tetrahydrofuran for dissolving the lithium aluminum hydride.

The rubbery copolymers of dienes, having 4 to about 8 carbon atoms such as butadiene and isoprene, with sulfur, are well known and may be prepared by emulsion polymerization with free radical polymerization initiator such as benzoyl peroxide or potassium persulfate, which generically are referred to herein as peroxy initiators. The treatment of the copolymer of sulfur and a diene either as a latex or a dry solid with a suitable solvent and with a mixture of a nonoxidizing mineral acid and zinc as the hydrogenolysis cleaving agent cleaves the sulfur bonds to yield polymer segments having terminal mercaptan groups. Alternately the latex can be treated to coagulate the polymer and then the coagulated polymer can be cleaved with the above agents while still wet or after it has been dried. It should be noted that where lithium aluminum hydride is the cleaving agent both the solvent and the polymer should be essentially anhydrous.

The present invention may be more fully understood from the following illustrative examples representative of the many combinations of diene monomers and mono alpha olefins which can be used to produce the cleaved polymers of this invention and to stabilize them for storage. The parts and percentages are by weight unless otherwise designated.

*Example I.—Preparation of sulfur containing polymer*

A typical polymerization recipe was as follows:

| | Parts by wt. |
|---|---|
| Water | 200 |
| Fatty alcohol sodium sulfate | 4 |
| Potassium persulfate | 0.4 |
| Tetrasodium ethylene diamine tetra acetate | 0.9 |
| Iso octyl phenoxy polyethoxy ethanol nonionic emulsifier | 2 |
| KCl | 1 |
| Hydrochloric acid (conc.) | 0.13 |
| Sulfur | Variable |
| Isoprene | 100 |
| Hydroquinone (shortstop) | 0.15 |

Sulfur, in the form of a 35% dispersion in water, was charged after the reactor had been sealed and just prior to charging the isoprene. The reactor temperature at the start of the polymerization was 130° F. and then gradually was raised to 150° F. in 5° steps, during the first two hours of the polymerization. The shortstop was added after the desired conversion had been reached.

The latices listed below were made at the sulfur level indicated with the above recipe and procedure. The shortstop was added at the indicated conversion.

Latex 8014—Total sulfur, 4.75 parts, one-half charged initially and remainder charged at about 25% conversion. Final conversion, 70%.

Latex 8098—Total sulfur, 2 parts, charged initially. Final conversion, 65%.

Latex 8140—Total sulfur, 2 parts, charged initially. Final conversion, 25%.

Latex 8257—Total sulfur, 3.99 parts, 1.33 parts charged initially and 1.33 parts charged at both 20 and 40% conversion. Final conversion, 65%.

*Example II.—Cleaving the polymer without isolating from latex*

Latex 8257, containing 100 grams of polymer, was placed in a 3-liter Erlenmeyer flask equipped with a mechanically driven agitator. After starting the agitator, the folowing ingredients were added:

1 gram ditertiary butyl hydroquinone
1000 ml. benzene
50 gram zinc dust, and
500 ml. isopropanol.

After 15 minutes' agitation, 150 ml. of concentrated HCl was added incrementally during a period of one hour. Agitation was continued for one hour after the last addition of HCl. The reaction mixture was permitted to stand until it separated into two nearly clear liquid layers with some dark residue on the bottom of the flask. The upper layer, benzene solution containing the cleaved polymer, was separated and treated with a quantity of anhydrous sodium sulfate to remove dissolved water. Another gram of ditertiary-butyl hydroquinone, the stabilizer, was added to the benzene solution containing the cleaved polymer. Then the benzene was evaporated from the solution at room temperature to obtain 85 grams of the cleaved liquid polymer.

Analysis of the polymer indicated 4.42% by weight of mercaptan sulfur in the polymer. The dry polymer from this latex was cleaved with lithium aluminum hydride and worked up to obtain a liquid polymer, which contained 4.4% mercaptan sulfur.

*Example III*

The polymer used in this example was formed by the copolymerization of the ingredients of a recipe containing by weight about 75 parts butadiene, 25 parts styrene and 3.6 parts sulfur with the polymerization being carried to about 70% conversion. This polymer, after coagulation of the latex and drying the washed coagulum, contained 4.62% sulfur and after acetone extraction the polymer contained 3.72% by weight of combined sulfur. The extracted polymer (3 parts) was then treated with dry toluene (100 parts) and the mixture was allowed to stand until the polymer exhibited appreciable swelling. A solution consisting of 15 parts of tetrahydrofuran and 0.5 part of lithium aluminum hydride was added to the toluene containing the swollen polymer. The resulting mixture was shaken at frequent intervals and allowed to stand at room temperature. In a short time, about 10 minutes, a liquid phase appeared due to the cleaving of the swollen polymer. Eventually, sufficient ethyl alcohol was added slowly to the mixture to react with the total amount of lithium aluminum hydride present and thereby destroy the excess cleaving agent. Phenyl beta naphthylamine (1.5% by weight) was added to the cement. Then the cement was washed with sufficient water to remove the alcohol and the other soluble components from the organic layer. The washed organic layer was filtered to remove any finely suspended lithium or aluminum salts. The solvent remaining in the organic phase was removed under a vacuum at room temperature. A typical analysis of the cleaved dry polymer showed the presence of 1.53% thiol sulfur.

*Example IV*

Dry polymer, 50 grams, obtained by coagulation of Latex 8140 with isopropanol, was swollen in 1000 ml. heptane in a 3-neck, 2-liter round bottom flask equipped with an agitator, a dropping funnel, and maintained under a nitrogen atmosphere. A total of 150 ml. of a 3% solution of LiAlH$_4$ in tetrahydrofuran, was added dropwise over a period of one hour, with the rate of addition being adjusted so that the temperature of the reaction mixture could be held below 35° C. After stirring another 10 minutes, the mixture was treated with alcohol, hydrochloric acid and washed with water, the liquid polymer remaining, after removing the solvent by vacuum evaporation at room temperature, had a mercaptan sulfur content of 3.6% and could be cured readily by the addition of lead peroxide.

The copolymers of sulfur and dienes useful in the practice of this invention can be prepared from those dienes having conjugated double bonds and containing from 4 to 10 carbon atoms. Inter polymers of these materials with each other or with mono alpha olefin containing from 2 to 18 carbon atoms can be used. Representative examples of the mono alpha olefins are styrene, acrylonitrile, methacrylonitrile, acrylic acid, methacrylic acid, and esters of acrylic acid and methacrylic acid where the alcohol of the ester has from 1 to about 20 carbon atoms with butyl acrylate and methyl methacrylate being representative examples.

These copolymers of sulfur and a conjugated diene per se or of sulfur, a conjugated diene and a mono olefin can be represented by the following sulfur-hydrocarbon general formula:

$$M_a(S_xM_b)_yS_t$$

where M is a monomer unit derived from a conjugated diene having from 4 to about 8 carbon atoms, for example, butadiene, ethyl butadiene, propyl butadiene, isoprene and pentadiene-1,3, and a mono alpha olefin, for example, acrylonitrile, styrene, and those listed herein, S is sulfur, $a$, $b$ and $y$ are integers having values from 1 to 100 or more and with the sum of $a$, $b$ and $y$ being sufficient to give a modecule having a molecular weight of at least about 50 to 100 thousand, and $x$ and $t$ being integers having values of 0 to 8.

The hydrogenolitic cleaved $M_a(S_xM_b)_yS_t$ polymer may be represented by the following formula:

$$HSM_p(S_xM_q)_kSH$$

where M is a monomer unit obtained from a conjugated diene having from 4 to 8 carbon atoms and alpha olefins having from 2 to 20 carbon atoms, $p$, $q$ and $k$ are integers having values of 1 and higher with the sum of $p$, $q$ and $k$ being less than those values which give the cleaved mercaptan terminated polymer a molecular weight greater than about 10,000 and $x$ is an integer having values of 0 to 8.

*Example V*

An isoprene acrylonitrile sulfur polymer containing 95 parts isoprene, 5 parts acrylonitrile and 5 parts sulfur was made according to the procedure of Example I and was shortstopped at 50% conversion. The resulting latex was dispersed in a mixture of isopropanol and benzene and cleaved with zinc and hydrochloric acid to give the cleaved polymer as a cement which contained a mercaptan content of 0.9% by weight. The benzene cement (2745 parts) was added to a suitable reaction flask together with 5 parts of potassium hydroxide which was dissolved in 20 parts ethanol. Then 100 parts of methyl acrylate (this is 1.4 equivalents based on the mercaptan content) was added to the reaction flask. After reacting 2.5 hours sufficient methanol was added to the flask to increase the volume of the fluids by 50%. After standing overnight the supernatant liquor was decanted to leave 930 parts of the swollen fractionated polymer. The swollen polymer was added to a mixture of 126 parts of ethanol and 168 parts of water, in which 33 parts of potassium hydroxide was dissolved and the resulting mixture was allowed to reflux. After 9 hours of refluxing the mixture was acidified with hydrochloric acid and the organic layer separated. The solvent present in the organic phase was removed by vacuum drying under a nitrogen atmosphere at about 80° C. 207 parts of a fluid polymer was obtained at the end of the drying period. This fluid polymer having an acid equivalent of 1680 was heated for 16 hours at 200° F. with 1.3 equivalents of a poly epoxide in the presence of 2% by weight of an amine catalyst. At the end of the heating cycle a solid rubbery product was obtained which had the following properties:

Swelling volume _____ 5.2
Solubility, percent _____ 5
Tensile, p.s.i. _____ 225
Elongation, percent _____ 200

Hence this carboxylic acid terminated polymer was suitable for making castings or as a potting composition.

*Example VI*

A thousand parts of a latex containing about 200 parts of a butadiene sulfur copolymer prepared according to the procedure of Example I was mixed with a thousand parts of benzene and 600 parts of isopropanol. To this mixture 75 parts of powdered zinc was added while the mixture was being agitated. This addition was followed by the addition of 150 parts concentrated hydrochloric acid over a period of 1 hour. At the end of 1 hour 1% ditertiary butyl hydroquinone on the polymer was added to the mixture and allowed to stand overnight. The next morning the aqueous layer was separated from the organic layer and the organic layer was treated with sufficient methanol to increase the volume by 50%. This treatment effected a precipitation of the higher molecular weight polymer. The layer of high molecular weight mercaptan terminated butadiene polymer had a mercaptan content of 1.2% by weight. 325 grams of the cement, containing the butadiene thiol polymer, was reacted with 16 parts of methyl acrylate (1.5 equivalents based on the mercaptan content of the polybutadiene thiol polymer) in the presence of 1 gram of potassium hydroxide dissolved in 20 parts of ethyl alcohol. On standing 1 hour an additional 15 parts of potassium hydroxide dissolved in 100 parts of water and 65 parts of ethanol was added to the reaction mixture and refluxed 9 hours. The potassium hydroxide was neutralized with hydrochloric acid and the organic phase separated from the aqueous phase. One gram of tri nonyl phenyl phosphite was added as an antioxidant. The polymer was isolated by evaporation under a vacuum at 80° C. in the presence of a nitrogen atmosphere. The semi-liquid material recovered had an acid equivalent weight of 1490 as determined from the carboxyl number.

*Example VII*

Twenty-five parts of a liquid thiol terminated polymer of sulfur and isoprene having an equivalent weight of 1270 was dissolved in a mixture of 85 parts of benzene and 17 parts ethanol. Then 10 parts of a 0.42 normal alcoholic KOH and 8.5 parts methyl acrylate was added. After one hour of contact time 7 parts of sodium hydroxide dissolved in a mixture of 45 parts ethyl alcohol and 10 parts water was added and the mixture was brought to reflux. After refluxing 16 hours the solution was acidified with dilute hydrochloric acid and washed several times with brine solution. The solvent remaining in the washed product was flashed off at room temperature under a nitrogen atmosphere and the polymer ultimately dried at 80° C. while maintained under vacuum. A yield of 23 parts of polymer was obtained and the carboxyl content indicated an equivalent weight of 1520. This liquid polymer when mixed with 15% by weight of polyallyl glycidyl ether in the presence of an amine type catalyst cured into a rubbery material which was only partially soluble in benzene.

The reaction product of the lower alkyl esters of acrylic and methacrylic with the thiol terminated polymers may be represented by the following polyester formula:

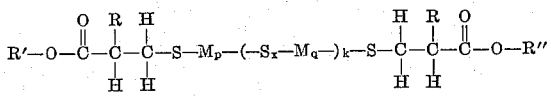

where R is hydrogen or methyl and R' and R" are lower alkyl radicals having from 1 to 10 carbon atoms and preferably 1 and 2, and $p$, $x$, $q$ and $k$ have the values given for the thiol terminated polymer.

Hydrolysis of this product produces an alcohol and a carboxylated product which upon acidification yields a carboxylic acid terminated polymer of this structure:

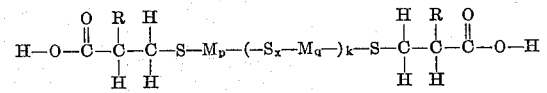

where R may be hydrogen or methyl and $p$, $x$, $q$ and $k$ have values given for the thiol terminated polymer.

While certain representative embodiments and details have been shown for the purpose of illustrating the invention, it will be apparent to those skilled in the art that various changes and modifications may be made therein without departing from the spirit or scope of the invention.

What is claimed is:
1. A composition of matter having the formula:

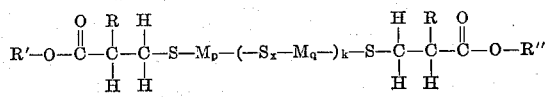

where $M_p$ and $M_q$ are polymer segments formed respectively from $p$ and $q$ units of monomer M, said monomer being selected from the class consisting of a conjugated diene, and the combination of a conjugated diene and a monoalpha olefin having from 2 to about 20 carbon atoms, said diene having from 4 to about 8 carbon atoms, said R is hydrogen or methyl, said R' and R" are hydrogen or a lower alkyl radical having from 1 to about 10 carbon atoms, $x$ is an integer having a value of 0 to 8 with the proviso that the composition contains some monosulfide linkages in the carbon-to-carbon chain of the compound, $p$, $q$ and $k$ are integers having values of at least 1 and their sum is less than those values which give the molecule a molecular weight greater than about 10,000.

2. The composition of claim 1 wherein R' and R" are hydrogen.
3. The composition of claim 1 wherein R is hydrogen.
4. The composition of claim 1 wherein R is methyl.
5. The composition of claim 2 wherein R is hydrogen.
6. The composition of claim 2 wherein R is methyl.
7. A process of preparing a polymer of the formula:

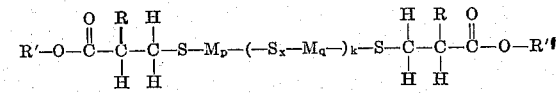

where $M_p$ and $M_q$ are polymer segments formed respectively from $p$ and $q$ units of monomer M, said monomer being selected from the class consisting of a conjugated diene, and the combination of a conjugated diene and a monoalpha olefin having from 2 to about 20 carbon atoms, said diene having from 4 to about 8 carbon atoms, said R is hydrogen or methyl, said R' and R" are hydrogen or a lower alkyl radical having from 1 to about 10 carbon atoms, $x$ is an integer having a value of 0 to 8 with the proviso that the composition contains some monosulfide linkages in the carbon-to-carbon chain of the compound, $p$, $q$ and $k$ are integers having values of at least 1 and their sum is less than those values which give the molecule a molecular weight greater than about 10,000, comprising (1) reacting a reactant selected from the class consisting of acrylic acid, methacrylic acid and an alkyl ester of acrylic acid or methacrylic acid with a thiol polymer of the formula:

$$H-S-M_p-(-S_x-M_q-)_k-S-H$$

where the symbols M, $p$, $x$, $q$ and $k$ have the values given for the first formula.

8. The process of claim 7 wherein the reaction of the reactant with the thiol polymer occurs in the presence of a base selected from the group consisting of the hydroxides of the alkali and alkaline earth metals and an amine.

9. The process of claim 8 wherein about 0.1 mol of base is used.

References Cited

UNITED STATES PATENTS

| 2,989,513 | 6/1961 | Hendry et al. | 260—79 |
| 3,046,129 | 7/1962 | Graham et al. | 260—79.1 |
| 3,135,716 | 6/1964 | Uraneck et al. | 260—79 |

FOREIGN PATENTS

| 1,286,281 | 1/1962 | France. |
| 975,907 | 11/1964 | Great Britain. |

OTHER REFERENCES

Noller, "Chemistry of Organic Compounds," 2nd ed. (1957), W. B. Saunders Co., Philadelphia, pages 170 to 172.

DONALD E. CZAJA, *Primary Examiner.*

LEON J. BERCOVITZ, *Examiner.*

M. I. MARQUIS, *Assistant Examiner.*